Patented Dec. 9, 1941

2,265,946

UNITED STATES PATENT OFFICE

2,265,946

PREPARATION OF ALIPHATIC ORGANIC ESTERS

Donald J. Loder, Wilmington, Del., assignor to E. I. du Pont de Nemours & Company, Wilmington, Del., a corporation of Delaware No Drawing. Application February 2, 1939, Serial No. 254,154

8 Claims. (Cl. 260—484)

This invention relates to the synthesis of organic compounds and more particularly to the preparation of aliphatic compounds by the interaction of hydroxy aliphatic acids, their esters, ethers or other derivatives thereof with olefinic hydrocarbons.

It is an object of the present invention to provide an improved process for the preparation of aliphatic organic esters, ether-esters and ether-acids from hydroxy organic acids or derivatives thereof of low molecular weight by reacting them with olefines. Another object of the invention is to provide an improved process for the interaction of olefines and hydroxy organic acids. A still further object of the invention is to provide a liquid or vapor phase process for the interaction of an olefine with aliphatic organic esters or ethers of glycolic acid to give esters and/or ether-esters and/or ether acids. A still further object of the invention is to provide optimum conditions and highly efficient catalysts for carrying out said organic syntheses. Other objects and advantages will hereinafter appear.

I have found that organic esters, ether-esters and ether-acids can be produced by the reaction of organic compounds, such as, for example, hydroxy, alkoxy, acyloxy, and halogen-substituted aliphatic organic acids and their esters with an olefinic hydrocarbon, i. e., an aliphatic hydrocarbon containing a double bond—for example, the olefines: ethylene, propylene, butylene, isobutylene; as well as the diolefines, such as butadiene, isoprene, etc. The hydrocarbons may be represented generically by the formula: $RR_1C:CR_2R_3$, in which R, $R_1$, $R_2$ and $R_3$ represent hydrogen or an alkyl radical. The compounds which may be reacted, in accord with my invention, with these olefinic hydrocarbons may be designated by the structural formula: $XCH(OY)COOZ$, in which X designates a hydrogen, alkyl, aryl, or aralkyl group, Y a hydrogen, alkyl, aryl, aralkyl, or acyl group or (OY) a halogen group, and Z is a hydrogen, alkyl, or aralkyl group. It will be appreciated that many compounds are represented by the formula $XCH(OY)COOZ$; it is to be understood, however, that I include thereby only those compounds which are relatively stable in the phase in which the reaction is conducted. The ester-ether-acid or ether-ester-forming reactions of the hydrocarbons with compounds of this nature apparently proceeds in accord with the equations:

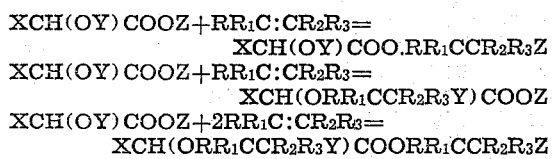

Thus, ethylene, for example, reacts with glycolic acid to give ethyl glycolate, ethoxy acetic acid and/or ethyl ethoxy acetic acid in accord with the following equations:

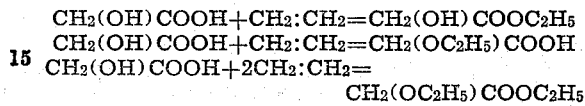

It may be stated that in accord with my process compounds conforming to the chemical formula

can be made wherein R and $R_1$ are dissimilar and at least one is an alkyl group, R is a hydrogen, alkyl, aryl, aralkyl or acyl group, and X and $R_1$ designate a hydrogen, alkyl, aryl or aralkyl group.

In accord with my invention, compounds conforming with the structural formula

may be reacted with an olefinic hydrocarbon to obtain compounds which are usually esters, ether-esters or ether-acids. The sole requirement is that the compounds conforming with this structural formula should not appreciably decompose under the reaction conditions. Accordingly, in the substitutions made in the X, Y and Z and/or (OY) positions, these substitutions should not render the resulting compound of such a nature that under the temperature of the reaction it appreciably decomposes. It will be appreciated, therefore, by those skilled in this art, that for X and Z many alkyl, aryl, and aralkyl groupings may be substituted. Examples of these compounds include the hydroxy carboxylic acids, such, for example, as glycolic, lactic, etc., the hydroxy acids in which the hydrogen of the hydroxy group has been substituted by the alkyl groups, methyl, ethyl, n- and isopropyl, n-isobutyl, glycolyl, etc., or the acyl groups, acetyl, propionyl, butyryl, etc., the esters of these substituted and unsubstituted acids, e. g., the methyl, ethyl, n- and isopropyl, n- and isobutyl, glycolyl and higher esters of the glycolates, lactates and the alkoxy and acyloxy acetates, propionates and butyrates above designated.

Raw materials suitable for use in the process are readily available from a number of sources. Thus, ethylene and the various homologues thereof are found in the gases evolved in cracking petroleum and may be separated therefrom, for example, by fractional liquefaction. It is preferable, for the sake of avoiding undesirable by-products, that the hydrocarbons used be employed in a relatively high degree of purity, altho if it is desired to make a mixture of esters a mixture of olefines may be reacted.

Inert gases, such as nitrogen, methane, and carbon dioxide, may be included with the reactants, this being advantageous in some cases, especially when the acids or esters are in the vapor phase, from the standpoint of controlling the temperature of the exothermic reaction and of limiting the extent thereof, for it may be desired to restrict the degree of conversion for the sake of enhancing the relative yield of the desired ester. When employing one or more of the above gases as inert carriers to effect these advantages, it or they should generally be present in amounts constituting approximately 40% or more by volume of the whole gaseous mixture.

The relative proportions of reactants can be varied, although it has been found that in order to avoid side reactions involving the polymerization of the olefines and especially when working in the vapor phase, it is of advantage to work with the compounds containing the (—COO—) group in excess with respect to the olefinic hydrocarbons. For either liquid or vapor phase reactions more than 1 mol of the olefine per mol of the (—COO—)— containing compound should preferably be present. Higher concentrations may be used, but usually under such conditions correspondingly lower pressures should be employed in order to inhibit all possible condensation.

The use of pressures in excess of atmospheric is preferred, although pressures from 1–900 atmospheres may be employed. The reaction proceeds over a wide range of temperatures while working under these pressures, although the optimum temperature varies with specific cases, depending inter alia upon the hydrocarbon being used. Generally the desired reaction can be carried out in the liquid phase at a temperature of 75–275° C., while in the vapor phase higher temperatures may be used, ranging from 150° C. to 375° C. From the practical standpoint the temperature should not be so low that the reaction rate is uneconomical nor so high as to result in undesirable by-products by decomposition and/or polymerization of the raw materials.

The following examples will illustrate methods of practicing the invention, although the invention is not limited thereto:

*Example 1.*—A mixture of 1 mol of glycolic acid and 1 mol of the dihydrate of boron fluoride, which may be prepared by dissolving anhydrous boron fluoride in water, is charged into a silver-lined pressure-resisting vessel. Two mols of propylene are pumped in to give a pressure of approximately 60 atmospheres and the mixture is heated for approximately 1 hour at a temperature between 100 and 125° C., agitation being applied during the heating step. The cooled product is discharged and the catalyst removed by washing with saturated aqueous sodium chloride solution. After drying the reaction product with anhydrous potassium carbonate, it was fractionally distilled under reduced pressure. Upon analysis the product showed 19% conversion to isopropyl glycolate, (B. P. 50 mm. 84° C.), 21.5% conversion to isopropyl isopropoxy acetate, (B. P. 50 mm. 92° C.) and 5% conversion to acid isopropyl isopropoxy polyacetate.

*Example 2.*—Upon repeating the process of Example 1 by utilizing ethylene in place of propylene as the olefine, the other conditions remaining the same, ethyl ethoxy acetate is obtained, together with other products.

*Example 3.*—A gaseous mixture containing approximately 80% methoxy acetic acid, 20% propylene and 1% hydrogen chloride is passed at a pressure of 800 atmospheres and a temperature of approximately 325° C. over activated carbon. A concentrate, containing isopropyl methoxy acetate is obtained upon cooling the converted gases.

*Example 4.*—A mixture of 1 mol of methoxy acetic acid and 1 mol of the dihydrate of boron fluoride, which may be prepared as described in Example 1, is charged into a pressure-resisting vessel. Two mols of propylene are pumped in to give a pressure of approximately 60 atmospheres and the mixture is heated for approximately 1 hour at a temperature between 100 and 125° C., agitation being applied during the heating step. The cooled product is discharged and the catalyst removed by washing with saturated aqueous sodium chloride solution. After drying the reaction product with anhydrous potassium carbonate, isopropyl methoxy acetate was recovered by fractional distillation.

Other catalysts which may be employed in the process include generally the inorganic acids, e. g., acids of phosphorus, sulfur, arsenic, and boron, which catalysts may be supported on activated charcoal or any other type of suitable catalyst support. These catalysts may be used with or without the presence of a volatile halide, such as is used in the processes described in the examples. Activated charcoal alone is a good catalyst for the reaction and when used in conjunction with an inorganic acid, which may be either of a volatile or non-volatile character, particularly so. The following catalysts may likewise be employed: calcium chloride, boron fluoride, (preferably hydrated with from 1.5 to 5 mols of water per mol of boron fluoride) cadmium phosphate, silicotungstic acid, zinc chloride, calcium chloride, calcium iodide, calcium bromide, and potassium fluoride. When employing the volatile halides in conjunction with a solid catalyst, such as activated carbon, impregnated or not with another catalyst, the volatile halides, such, for example, as hydrogen chloride and ammonium chloride, are particularly useful, and, in some instances, the halogens themselves are sufficiently active in conjunction with active carbon to catalyze the reaction. Generally speaking catalysts adapted for the preparation of acids from alcohols and carbon monoxide are suitable for catalyzing the reactions in accord with my invention.

The apparatus, which may be employed for conducting these reactions, may be of any conventional type and preferably one in which the temperature of exothermic reactions can be readily controlled at the desired value. Owing to the corrosive action of the esters produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

From a consideration of the above specification it will be realized that any improvements in or over the reaction of olefinic hydrocarbons and acyloxy-containing compounds in accord with this invention will come within its scope without sacrificing any of the advantages thereof.

I claim:

1. The process which comprises reacting a substituted acetic acid selected from the group consisting of acyloxy and alkoxy acetic acids and their esters with an olefine containing not more than 3 carbon atoms at a temperature between 75° and 375° C.

2. The process which comprises reacting an alkoxy acetic acid with an olefine containing not more than 3 carbon atoms at a temperature between 75° and 375° C.

3. The process which comprises reacting an acyloxy acetic acid with an olefine containing not more than 3 carbon atoms at a temperature between 75° and 375° C.

4. The process which comprises reacting a substituted acetic acid selected from the group consisting of acyloxy and alkoxy acetic acids and their esters with propylene at a temperature between 75° C. and 375° C.

5. The process which comprises reacting methoxy acetic acid with propylene at a temperature between 75° C. and 375° C.

6. The process which comprises reacting acetoxy glycolic acid with propylene at a temperature between 75° C. and 375° C.

7. A process for the preparation of isopropyl methoxy acetate which comprises passing the gaseous mixture containing approximately 80% methoxyacetic acid, 20% propylene, and 1% hydrogen chloride at a pressure of approximately 800 atmospheres and a temperature of approximately 325° C. over activated carbon.

8. A process for the preparation of isopropyl methoxy acetate which comprises reacting approximately one mole of methoxyacetic acid with two moles of propylene in the presence of one mole of boron fluoride dihydrate at a temperature between 100 and 125° C. and under a pressure of approximately 60 atmospheres.

DONALD J. LODER.